United States Patent
Gulian et al.

(10) Patent No.: US 11,555,621 B1
(45) Date of Patent: Jan. 17, 2023

(54) ADAPTER FOR MODULAR CATALYTIC MONOLITHS

(71) Applicant: The United States of America, as represented by the Secretary of the Navy, Arlington, VA (US)

(72) Inventors: Franklin J. Gulian, Schwensville, PA (US); Alan D. McCarrick, Garnet Valley, PA (US)

(73) Assignee: The United States of America, as represented by the Secretary of the Navy, Arlington, VA (US)

( * ) Notice: Subject to any disclaimer, the term of this patent is extended or adjusted under 35 U.S.C. 154(b) by 95 days.

(21) Appl. No.: 16/834,313

(22) Filed: Mar. 30, 2020

Related U.S. Application Data

(63) Continuation-in-part of application No. 16/803,085, filed on Feb. 27, 2020, now abandoned.

(60) Provisional application No. 62/829,858, filed on Apr. 5, 2019.

(51) Int. Cl.
  *F24F 13/28* (2006.01)
  *F24F 8/167* (2021.01)
  *F24F 8/10* (2021.01)
  *F01N 3/10* (2006.01)

(52) U.S. Cl.
  CPC ............... *F24F 8/167* (2021.01); *F01N 3/10* (2013.01); *F24F 8/10* (2021.01); *F24F 13/28* (2013.01)

(58) Field of Classification Search
  CPC .. B03C 3/32; B03C 3/017; B03C 3/08; B03C 3/41; B03C 3/47; B03C 2201/08; F24C 15/2035; Y10S 55/36
  USPC .......................................................... 422/177
  See application file for complete search history.

(56) References Cited

U.S. PATENT DOCUMENTS

| | | | |
|---|---|---|---|
| 4,916,001 A * | 4/1990 | Whittenberger | B01D 53/8631 428/116 |
| 8,066,950 B2 * | 11/2011 | Newburry | F01N 3/2839 422/180 |
| 2005/0042151 A1 * | 2/2005 | Alward | D04H 1/4209 422/177 |
| 2006/0080967 A1 * | 4/2006 | Colket | F23C 13/00 60/777 |
| 2017/0159529 A1 * | 6/2017 | Kleuderlein | F01N 13/017 |

* cited by examiner

*Primary Examiner* — Tom P Duong
(74) *Attorney, Agent, or Firm* — Mark J. Rosen

(57) ABSTRACT

Adapters, devices, and methods are provided that permit catalytic monolith modules to be used in catalytic converter systems designed for fixed bed catalysts using granular catalysts. The adapter provides air flow straightening upstream from the catalytic monoliths, mitigating non-uniform flow into the catalytic monoliths. The adapter is reusable, allowing simple replacement of spent catalytic monolith modules.

19 Claims, 8 Drawing Sheets

ADAPTER FOR MODULAR CATALYTIC MONOLITHS

STATEMENT OF GOVERNMENT INTEREST

The invention described herein may be manufactured and used by or for the Government of the United States of America for governmental purposes without payment of any royalties thereon or therefor.

FIELD OF THE INVENTION

The invention is related to the field of air purification systems using catalytic converters, more particularly to adapting catalytic converters designed for use with a fixed bed catalyst for modular use of catalytic monoliths.

BACKGROUND OF THE INVENTION

Life support systems are required on submarines, space vehicles, and other closed air environments where human occupancy is necessary for extended periods of time, and such systems operate by controlling the temperature, barometric pressure, and composition of the enclosed air. Temperature and barometric pressure are controlled by air conditioning and nitrogen reservoir systems, respectively, while the composition of the environment is controlled by oxygen generation (or replenishment), carbon dioxide removal, and other systems designed to remove contaminants that are generated or released by personnel, equipment, and materials into the closed environment. On a submarine, these contaminates include carbon monoxide, hydrogen, volatile organic compounds (VOC), halogenated VOC, and particulate material, which would adversely affect the sailors if they were not continuously removed. Techniques used to control the amounts of contaminants in the breathing air onboard closed air environments such as on a submarine include absorbents for selected contaminants, filters for particulates, restrictions on materials and activities permitted on board the submarine, and engineered systems.

Engineered systems for contaminant removal include, among others, catalytic converters. A type of catalytic converter known as a burner heats contaminated air, exposes the heated air to a catalyst which removes contaminants, and thereby produces purified air. One such system that removes carbon monoxide (CO), hydrogen ($H_2$), and many VOCs from the air on a submarine is the Carbon Monoxide-Hydrogen (CO—$H_2$) burner, which is based on catalytic oxidation at elevated temperature. Air enters the CO—$H_2$ burner through a particulate filter and is passed through a heat exchanger before being heated further and then passed through an oxidation catalyst bed. One commonly used catalyst is a mixture of copper oxide and manganese dioxide (known as a Hopcalite® type catalyst) which operates by chemically converting harmful contaminants to other chemical compounds which are less hazardous and/or which can be removed from the submarine by other systems. From the catalyst bed, the treated air flows again though the heat exchanger, where a majority of the heat is transferred to the incoming air, and then to a cooling coil. An after-filter consisting of a granular basic material (e.g., lithium carbonate) is placed downstream from the cooling coil to capture acidic compounds that may form over the catalyst.

Gravimetrically, Hopcalite® type catalysts have relatively low activity and their use therefore requires a large mass of catalyst to perform the necessary chemical conversions. Hopcalite® type catalysts are also granular and have to be manually poured or scooped into the catalyst tray or drawer within the catalyst chamber. When the Hopcalite® type catalyst is handled in this fashion, it creates a significant amount of toxic and irritating dust in the air. Consequently, operators are required to wear respirators, chemical protective gloves, and goggles for protection and other personnel are required to leave the immediate vicinity. Hopcalite® type catalysts are also hazardous materials, and the spent catalyst must be treated as a hazardous waste.

When loading the granular catalyst into the catalyst drawer, it is often difficult to achieve a uniform void fraction throughout the bed, and particularly at the edges of the drawer. Areas of a higher void fraction offer lower resistance to air flowing through the bed and cause flow non-uniformity, known as channeling. Channeling is analogous to flow that is bypassing the bed, reducing the overall effectiveness of the catalyst because contaminants are not chemically converted unless they contact the catalyst surface. Even if a uniform void fraction were achieved during the loading process, non-uniformities in the void fraction can develop over time due to catalyst settling, attrition, and thermal cycling when the burner is started up and shut down, which may lead to fracturing of the catalyst granules and dust formation. This problem can be severe for fixed bed catalysts operating with air flowing in a non-downward direction. These problems with fixed bed catalysts are well known to those skilled in the art.

The catalyst industry has developed catalytic monoliths to address certain problems associated with fixed beds. Monoliths are structures that provide high geometric surface area to support the catalytically active ingredients while eliminating dust and attrition and presenting a low pressure drop for the flowing air. Monoliths are widely used in automotive catalytic converters and stationary emission control applications. The monoliths are manually placed into a catalyst drawer as one would arrange blocks or bricks in a single layer to fill the drawer. A gravimetrically highly active catalyst is required to use a monolith, however, because the geometric surface area of a monolith is usually lower than that of a fixed bed of granular material. Hopcalite® type catalysts are generally not used in monolithic form because of their low gravimetric activity.

One disadvantage of placing multiple smaller catalytic monoliths in a catalyst drawer is that after placing them into position, some monoliths may have to be manually cut or carved for placement around the peripheral dimensions of the catalyst chamber. However, most catalyst chambers are designed to be rectangular, and one or multiple monoliths are commonly installed into a metallic frame that approximates the catalyst chamber dimensions.

Poor air flow distribution, that is, non-uniform flow, upstream from the monolith will not self-correct as it travels through the structure. Regions with higher air flow are characterized by reduced catalyst contact time and concomitantly lower conversion of contaminants. This problem is less severe for fixed or packed beds where readily free and extensive radial flow in all directions promotes mixing and cross-flow of incoming air and promotes a more uniform velocity profile throughout the catalyst bed when channeling is not present. Monoliths, however, generally provide at best a limited ability for cross-flow of incoming air and have a limited ability to promote flattening of the velocity profile therein. Extruded ceramic monoliths may be made from a variety of ceramic materials such as cordierite and the like. Such extruded ceramic monoliths with channels therethrough prevent all air flow from one channel to another, allowing radial dispersion only within each individual channel (and thereby access to the catalytic inner surface of the channel) as the air flows through the channels from the upstream inlet entry surface to the downstream outlet exit surface. Use of an extruded ceramic catalytic monolith thus requires more uniform incoming air flow in order to spread the mass of the air to all the channels and to the full surface area of the catalyst in the channels.

Metal foil monoliths may be constructed in a variety of configurations. See generally Gulian et al., Ind. Eng. Chem. Res., vol. 30, no. 1 (1991). Some such configurations, such as wound corrugated metal foil monoliths, provide channels passing through the monolith allowing no cross-flow and mixing between channels. In such a design, the wound metal foil monolith behaves similarly to an extruded ceramic monolith, in that the air flow entering each channel is restricted to passage only through that same channel. Other configurations, such as folded layered metal foil monolith structures, may provide at least some cross-flow and mixing between channels in designs in which the folding creates interconnections between the channels. Such configurations allow air entering one channel to disperse to one or more adjacent channels, but such dispersion is generally far less than in a fixed bed system. Because non-uniform flow distribution through the monolithic structure lowers the overall effectiveness of the system, effective monolithic catalyst systems would be improved by providing a uniform air flow upstream from the monolith.

Methods of achieving more uniform air flow are well known to those skilled in monolith system design and typically include providing long and straight ducting upstream from the monolith for air self-straightening, flow straighteners, installing air expansion zones, and/or installing screens. Straight ducting and expansion zones are preferred in certain applications, particularly those that have sufficient physical space, because they introduce the least turbulence and back pressure. Maintaining lower turbulence and lower back pressure are particularly important in, for example, automotive and pollution control applications, in order to achieve optimum performance and efficiency, and may also reduce system noise where such noise reduction is desirable. Flow straighteners using perforated plates or screens are not well suited in such applications because they generally increase back pressure.

Catalytic burners onboard US submarines are designed to fit in highly constrained tight spaces and do not have sufficient space for long straight lengths of ducting or expansion zones. Additionally, the space constraints on submarines contribute to more severe non-uniform air flow distribution upstream from the catalyst chamber. This flow non-uniformity would reduce the effectiveness of a catalytic monolith used in a submarine $CO-H_2$ burner designed for a fixed bed catalyst.

The art is in need of improved devices and methods enabling the use of catalytic monoliths in catalytic converters otherwise designed for use with a fixed bed catalyst.

SUMMARY OF THE INVENTION

Having observed the aforementioned problems, the inventors hereof have invented improved devices and methods for adapting catalytic converters to use catalytic monoliths where space is restricted and not amenable to the use of long straight ducting, expansion zones, and other flow straightening means requiring more space.

The invention contemplates use of adapters in systems for catalytic treatment of a variety of contaminated gases. While the term "air" is used herein, those of skill in the art will appreciate that the adapter of the invention is equally useful in such systems for treatment of gases other than air. The invention is useful in a wide variety of catalytic converters where it would be desirable to use catalytic monoliths, such as in submarine burners designed to purify air where space limitations have posed obstacles to using catalytic monoliths. Additionally, for example, the invention is useful in catalytic converters designed to control NOx (nitric oxide and nitrogen dioxide) or VOC emissions from stationary sources such as coal or oil fired power plants where the use of catalytic monoliths assists in compliance with emissions requirements, but where space may also be limited. While the monolith materials and catalysts may differ for different applications, the adapter of the invention is applicable both to burners and to other catalytic converters such as NOx converters capable of catalytically converting NOx to $N_2$.

The invention provides an adapter that enables a catalytic monolith module to be used in a system that was designed for a fixed bed catalyst in space-limited environments, such as a submarine $CO-H_2$ burner. The adapter device is made to slide into the catalyst chamber of the burner (in place of a catalyst drawer containing granular catalyst) and supports an air flow straightener element upstream from one or multiple catalytic monolith modules which slide into the adapter. The adapter's outer dimensions in length and width are substantially the same as the drawer, although the adapter's height may differ in some embodiments. The dimensions of the adapter are specified to fit in an existing catalytic converter's catalyst chamber, such as in a submarine burner, like a Mark V $CO-H_2$ burner, and the adapter can be oriented in either a horizontal or vertical direction to accommodate the air flow in different burner models.

A catalytic monolith module consisting of only bare catalytic monoliths can be used, but housings or frames that contain one or more catalytic monoliths may be preferred in some applications to avoid cracking or fracturing the catalytic monoliths. The monolithic modules of the invention contemplate both bare catalytic monoliths and those housed in frames, which are generally constructed from metal or other materials resistant to the environment in the catalytic chamber of a burner.

In some embodiments, the flow straightener element can consist of a perforated plate or multiple layers of a perforated plate at specific locations. Alternatively, the flow straightener element may consist of a woven screen or multiple layers of a woven screen at specific locations. The perforations and screens may be uniform or non-uniform. The flow straightener could also consist of a combination of perforated plates and screens in specific areas. For monoliths used in systems originally designed for fixed beds, perforated plates and screens are particularly advantageous because the added pressure drop at least partially compensates for the lower pressure drop of monoliths as compared to fixed beds.

The adapter may be made from rigid materials such as stainless steel or other metals or alloys resistant to corrosion, oxidation, and carbonization at high temperatures, such as austenitic nickel-chromium-based alloys (e.g., Inconel®, Incoloy®, and the like). The adapter supports the flow straightener at a distance upstream from the monolith to permit flow straightening before the air enters the monolith. The adapter is not part of the catalytic monolith module itself, so the adapter may be reused when an old or exhausted catalytic monolithic module is changed out.

The adapters and devices of the invention beneficially permit the use of catalytic monolith modules which are easily handled using gloved hands, and can be used in a system incorporated in a space-constrained environment, such as a submarine burner. The invention thus reduces necessary labor, reduces variability, lowers the production of dust when loading the catalyst into the submarine CO—$H_2$ burner, and minimizes health risks to sailors. The adapters and devices of the invention also permit catalytic monolithic modules to be produced more economically with simple rectangular dimensions because the flow straightener elements and supporting tabs are included on the adapter.

The adapter is particularly suitable for monoliths containing catalysts such as platinum, palladium, ruthenium, rhodium, gold or any other highly active noble metal catalysts that are easily applied both to extruded ceramic monolith substrates to produce catalytic monoliths, and to metallic monolith substrates made from metal foils which are then configured by winding or folding into catalytic monoliths. The catalytically active metals are typically dispersed on high surface area oxides such as alumina, silica, zirconia, titania, ceria, and the like, or any combination thereof, and washcoated onto the monolith substrate. Alternatively, and particularly for NOx converters, the catalyst may be co-extruded with other materials to form the catalytic monolith. For example, catalytic monoliths suitable for use in NOx converters may be constructed from vanadium oxide, tungsten oxide, titanium oxide, and other materials. Such catalytic monoliths are prepared without needing washcoating because the catalyst is part of the monolith as extruded.

In one aspect, the invention provides an adapter for accommodating a catalytic monolith module (referred to herein alternatively as a monolith module) in a catalytic converter with a catalytic chamber, having a rigid frame with an open front face, and an air flow straightener having a perforated plate. The adapter's open front face allows insertion of the catalytic monolith module. In another aspect, the air flow straightener has a mesh screen. In another aspect, the adapter also has tabs extending longitudinally along its right and left faces to be supported by tab supports in the catalyst chamber of the catalytic converter. The adapter may also have a lip on its bottom for retaining the catalytic monolith module. The catalytic converter may be a burner, such as a CO—$H_2$ burner. One such CO—$H_2$ burner used by the Navy on submarines is the Mark V CO—$H_2$ burner.

In one aspect, the invention provides an aforementioned adapter with an inserted catalytic monolith module. The catalytic monolith module has at least one catalytic monolith such as an extruded ceramic catalytic monolith or a metal foil catalytic monolith. A catalytically active noble metal is dispersed on a high surface area oxide support and washcoated onto the monolith substrate. In an embodiment using extruded ceramic substrate, the extrusion produces an extruded ceramic monolith, to which the catalyst is then applied. In an embodiment using metal foil substrate, the catalyst is preferably applied prior to folding or winding the metal foil into a monolith. In both such embodiments, a catalytic monolith is produced.

The noble metal may be selected from platinum, palladium, ruthenium, rhodium, and gold, or any mixture of these. The oxide may be selected from alumina, silica, zirconia, titania, and ceria, or any mixture of these. In some aspects, the catalytic monolith is an extruded ceramic catalytic monolith with a cell density typically at least 400 cells per square inch. The catalytic monolith module may have a plurality of extruded ceramic catalytic monoliths, in which case such monoliths may be separated by individual supporting brackets and/or interstitial filler. In other aspects, the catalytic monolith is a metal foil catalytic monolith with an effective cell density typically at least 150 channels per square inch. In some aspects, the catalytic monolith module has a frame, which may be metal or other durable materials sufficient to support the monoliths in the monolith module.

In some aspects, the catalytic monolith module has at least one retainer screen, at or near the inlet (upstream) and/or outlet (downstream) surfaces of the catalytic monoliths, to retain the catalytic monoliths therein. In particular aspects used in a submarine, the dimensions of the adapter are about 32¼ inches long, 22¹¹⁄₁₆ inches wide, and 4¹⁵⁄₁₆ inches deep and the dimensions of the module's metal frame are slightly less than those of the adapter such that the monolith module fits within the adapter. The catalytic monolith module may be a fractional size such that an integral number of monolith modules fit within the adapter. Where multiple monolith modules are used in a single adapter, the monolith modules may be separated by interstitial filler. Such adapters would be suitable for use in a Mark V CO—$H_2$ burner or other burners having catalyst chambers with similar dimensions. Those of skill in the art will appreciate that the adapter of the invention may be used in applications which were designed for use with fixed bed catalysts other than burners. The adapter with catalytic monolith module allows for replacement of the fixed bed catalyst in a variety of catalytic converters where contaminated gas is directed to the catalyst, thereby conferring the advantages of monolithic catalysts and simple modular replacements.

In one aspect, the invention provides a method of adapting a catalytic converter designed for use with a fixed bed catalyst drawer (such as a Mark V CO—$H_2$ burner) to be used with a catalytic monolith, by substituting an aforementioned adapter in place of the fixed bed catalyst drawer, and inserting a catalytic monolith module in the adapter. In another aspect, the adapter is reusable, by simply removing an exhausted catalytic monolith module from the adapter and inserting a replacement. In another aspect, the catalytic converter is a CO—$H_2$ burner.

These and other aspects of the invention will be readily appreciated by those of skill in the art from the description of the invention herein.

DETAILED DESCRIPTION OF THE INVENTION

The adapter of the invention provides more uniform straightened air flow, directing contaminated air toward a catalytic monolith module inserted in the adapter. The adapter may be made from stainless steel, carbon steel, or other metals or alloys resistant to degradation in the environment of a burner, such as austenitic nickel-chromium-based alloys (e.g., Inconel®). The adapter supports the flow straightening element a distance upstream from the monolith inlet surface to permit flow straightening before the air enters the monolith. The flow straightening element may be a perforated plate constructed from any of a variety of temperature and corrosion resistant materials, such as those of the adapter itself. Additionally, the adapter is not part of the monolith module itself, so the adapter may be reused when an old or exhausted catalytic monolith module is changed out.

Catalytic monoliths may be made from a variety of materials. In some embodiments, an extruded ceramic catalytic monolith is constructed from ceramic monolith substrate material, such as cordierite. The ceramic monolith substrate material is extruded, to produce an extruded ceramic monolith. Catalytically active material is then applied to the monolith to produce a catalytic monolith. In other embodiments, a metal foil catalytic monolith is constructed from metal foil monolith substrate, such as corrugated metal foil. The metal foil monolith substrate has catalytically active material applied and may then be wound, folded, or otherwise configured to produce the metal foil catalytic monolith.

The catalytically active materials applied to either extruded ceramic or metal foil monolith substrates are typically catalytically active noble metals such as platinum, palladium, ruthenium, rhodium, gold, or any other highly active noble metal catalysts, and combinations thereof. To apply such catalysts to the monolith substrate materials, the catalysts are generally dispersed on high surface area oxides such as alumina, silica, zirconia, titania, ceria, and the like, or any combination thereof, and washcoated onto the monolith substrate.

The adapters and devices of the invention beneficially permit the use of catalytic monolith modules which are easily handled using gloved hands, and can be used in a system incorporated in a space-constrained environment, such as a submarine's Mark V or other $CO-H_2$ burner. The invention thus reduces necessary labor, reduces variability, lowers the production of dust when loading the catalyst into the submarine burner, and minimizes health risks to sailors. The adapters and devices of the invention also facilitate catalytic monolith modules to be produced more economically with simple rectangular dimensions because the flow straightener elements and supporting tabs are included on the adapter.

Figure 1:
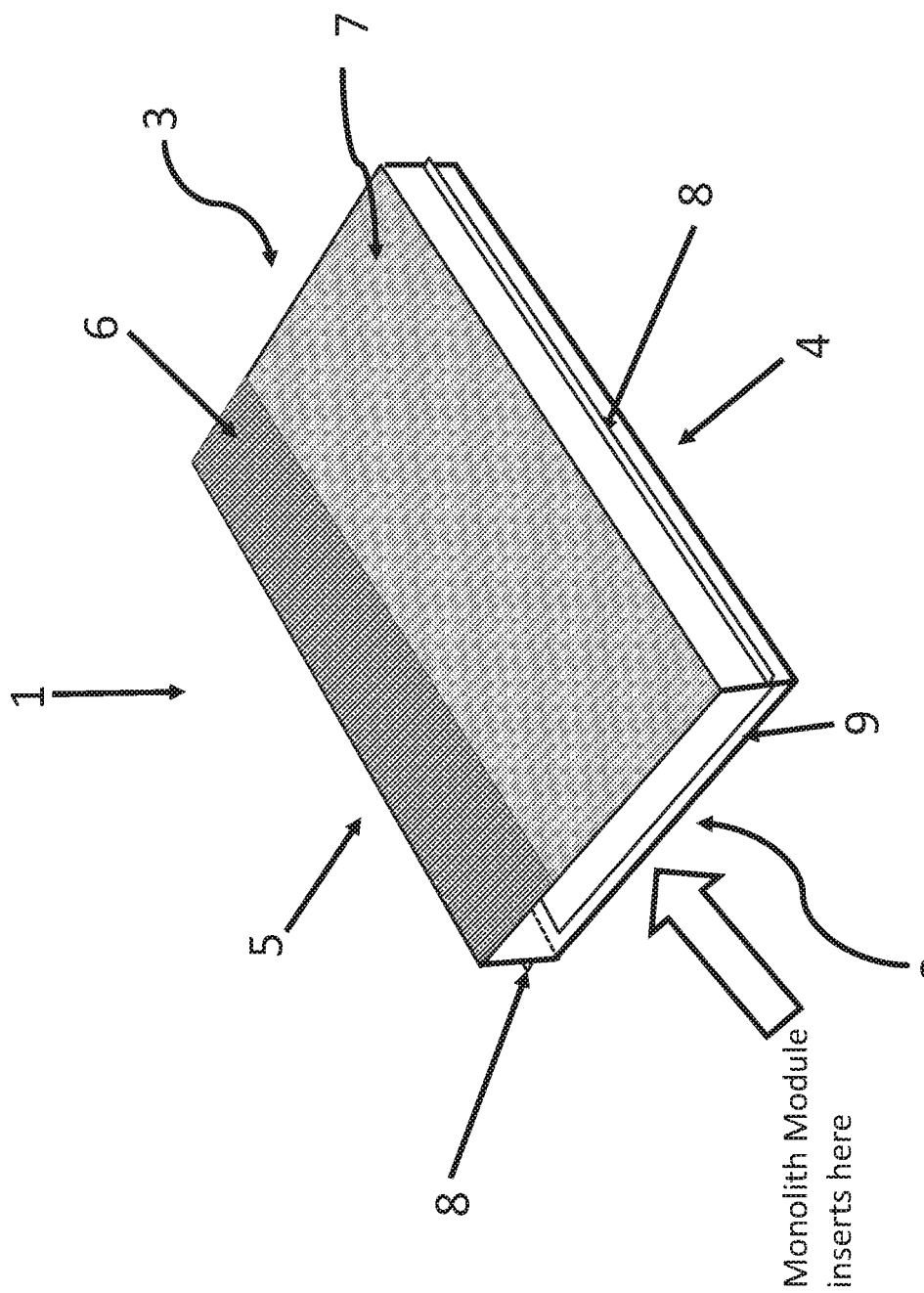
FIG. 1 depicts an embodiment of the adapter with a flow straightener element having a perforated plate and a screen mounted on top, the adapter having a slot for insertion of catalytic monolith modules.
Figure 5:
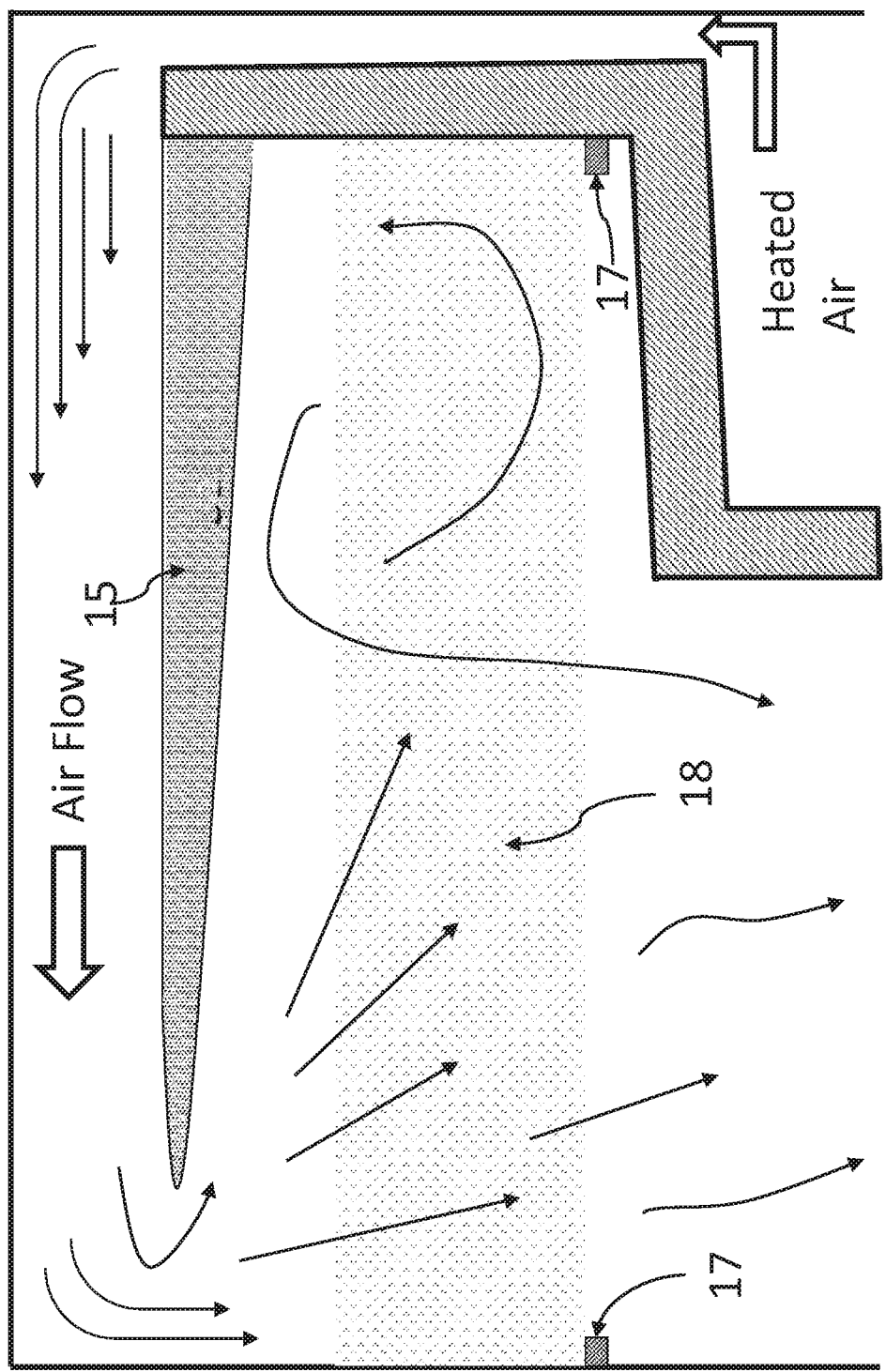
FIG. 5 depicts a frontal view of a CO—$H_2$ burner air flow path without the catalyst bed present.
Figure 6:
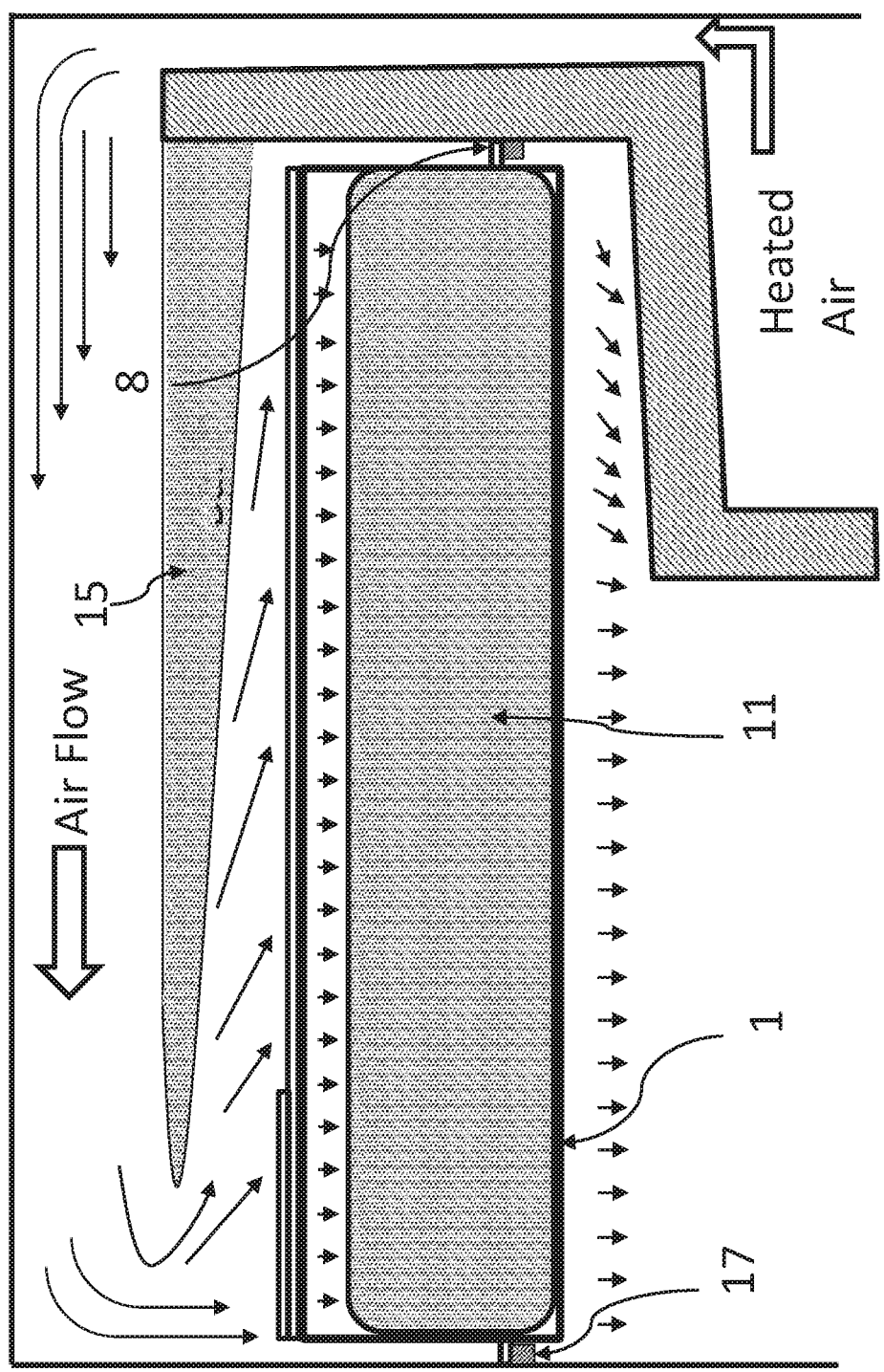
FIG. 6 depicts an adapter with inserted catalytic monolith module, positioned in a CO—$H_2$ burner.

With reference to the Figures, FIG. 1 shows one embodiment of an adapter 1 of the invention. The flow in a Mark V $CO-H_2$ burner toward the adapter is downward, and the flow straightener element in this case is mounted on the top face of the adapter 1. The flow straightener element has a perforated plate 7 with a mesh screen 6 placed over the left hand portion of the perforated plate 7 as shown in face-on view in FIG. 4. While embodiments of the invention are described herein with reference to left and right sides or portions, those of skill in the art will readily appreciate that adapters may be constructed with the opposite orientation, depending on the orientation of the burner and baffle 15 where the adapter will be placed. A metal tab 8 extends along the sides of the adapter 1 so that the adapter 1 slides into the catalyst tray of the $CO-H_2$ burner. The adapter 1 is supported by the catalyst tray tab supports 17 which are part of the burner, as shown in FIGS. 5 and 6. The front face 2 of the adapter 1 is open to allow one or multiple catalytic monolith modules 11 to slide into the adapter 1. A catalytic monolith module 11 may be installed into the adapter 1 before or after the adapter 1 is slid into the $CO-H_2$ burner. The side faces 4, 5 and back face 3 of the adapter are closed. The bottom of the adapter is open except for a lip 9 (typically about one inch) around the perimeter to support the catalytic monolith module or modules within the adapter 1. Additional support lips may be provided on the adapter in some embodiments, such as where individual monoliths are used instead of a monolith module 11.

Figure 2:
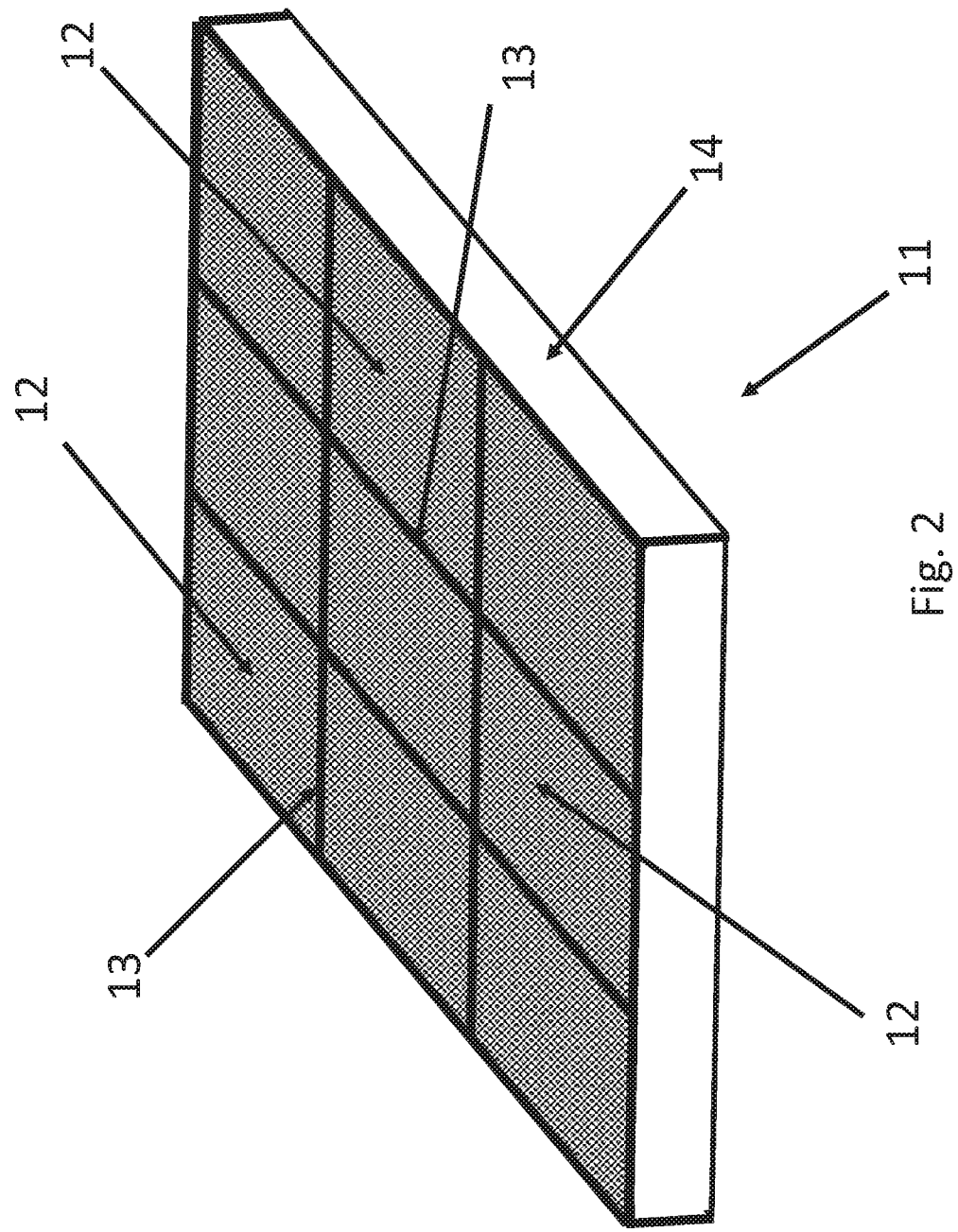
FIG. 2 depicts an exemplary catalytic monolith module containing multiple catalytic monoliths separated by interstitial filler.

FIG. 2 shows a catalytic monolith module 11 containing a matrix array of individual catalytic monoliths 12 with interstitial filler 13 between the monoliths. Such interstitial filler 13 preferably prevents air flowing through the interstitial spaces between the individual monoliths 12 in the monolith module 11, and may be made from ceramic blanket insulating material such as Fiberfrax® or the like. In other embodiments the monolith module 11 may be constructed from a single full size monolith catalyst 12 which occupies essentially all the area of the module, or other combinations of multiple smaller monoliths 12. The monoliths 12 themselves may be sized such that an integral number fits into the adapter 1, or fractional sized monoliths may be used in order to fill the catalytic monolith module.

A catalytic monolith module 11 designed for use in the Mark V $CO-H_2$ burner, for example, may have a metallic frame 14 with outside dimensions of 32 inches long by 22½ inches wide by 4⅜ inches deep. Such a monolith module 11 may accommodate an array of individual catalytic monoliths. For example, monoliths 12 each of which measure 6 inches long by 6 inches wide by 3.5 inches deep (e.g., in an array of 5 monoliths in the length direction by 3½ monoliths in the width direction) with interstitial filler 13 in the form of blanket material separating the monoliths 12. Such a module 11 fits into an adapter slightly larger in length and width, such as 32¼ inches long by 22¹¹⁄₁₆ inches wide by 4¹⁵⁄₁₆ inches deep, which itself would fit in the catalyst chamber of the burner. The adapter thus takes the place of the catalyst drawer in the catalyst chamber. As discussed below, the adapter is deeper than the monoliths themselves in order to preserve a gap 16 between the upper surface of the monoliths and the flow straightener. Those of skill in the art will appreciate that the dimensions of the adapter and the module may be varied depending on the application, thus, other sizes may be constructed for use in other burners.

When multiple modules are used, a high temperature fabric or blanket material (such as the material used for interstitial filler 13 which separate individual monoliths within a module) may be placed between the modules to prevent air flow between the modules. For example, three catalytic monolith modules with outside dimensions of 32 inches long by 7½ inches wide by 4⅜ inches deep could be placed in the adapter and used in the Mark V $CO-H_2$ burner. Alternatively, three catalytic monolith modules with dimensions 10⅔ inches long by 22½ inches wide by 4⅜ inches deep may be placed in the adapter for use in a Mark V $CO-H_2$ burner. Such an alternative embodiment may be preferred on a submarine where storage of full length monolith modules may be undesirable. Each assembled monolith module may optionally have a retainer screen designed to secure and constrain the monolith or monolith blocks within the monolith module. For example, the retainer screen in some embodiments is a heavy gauge stainless steel wire retainer screen with 7/16 inch square openings secured at the upstream surface and/or downstream surfaces of the monoliths. Other optional retention means will be appreciated by those of skill in the art.

Figure 3:
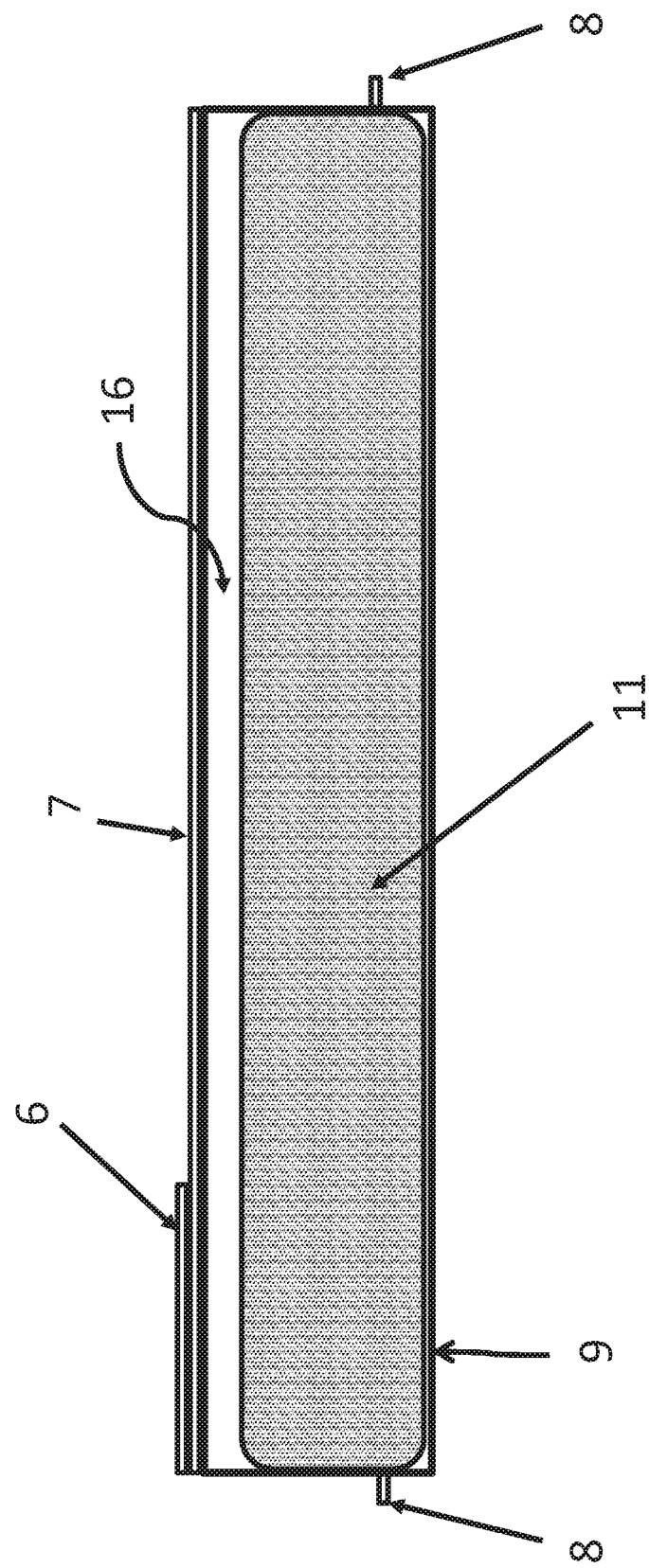
FIG. 3 depicts a view of a monolith module inserted into the adapter. A gap is maintained between the flow straightening element and the catalytic monolith module.

FIG. 3 shows a frontal view of a monolith module 11 placed in the adapter 1. The adapter 1 maintains a gap 16 (typically about one inch) between the top surface of the monolith(s) themselves and the perforated plate 7 or other flow straightener. This gap 16 is provided to allow dissipation of the turbulence that is created in the air as it travels through the holes in the perforated plate 7, providing a more uniform air flow to the catalytic monoliths. The gap is generally larger than the diameter of the holes in the perforated plate 7, preferably at least six times the diameter of the largest holes. The monolith module 11 is supported by the lip 9 that extends inside the bottom perimeter of the adapter. The tabs 8 on the side of the adapter 1 support the adapter 1 when it is installed in the burner, sliding along and ultimately resting upon the tab supports 17 inside the burner catalyst chamber.

Figure 4:
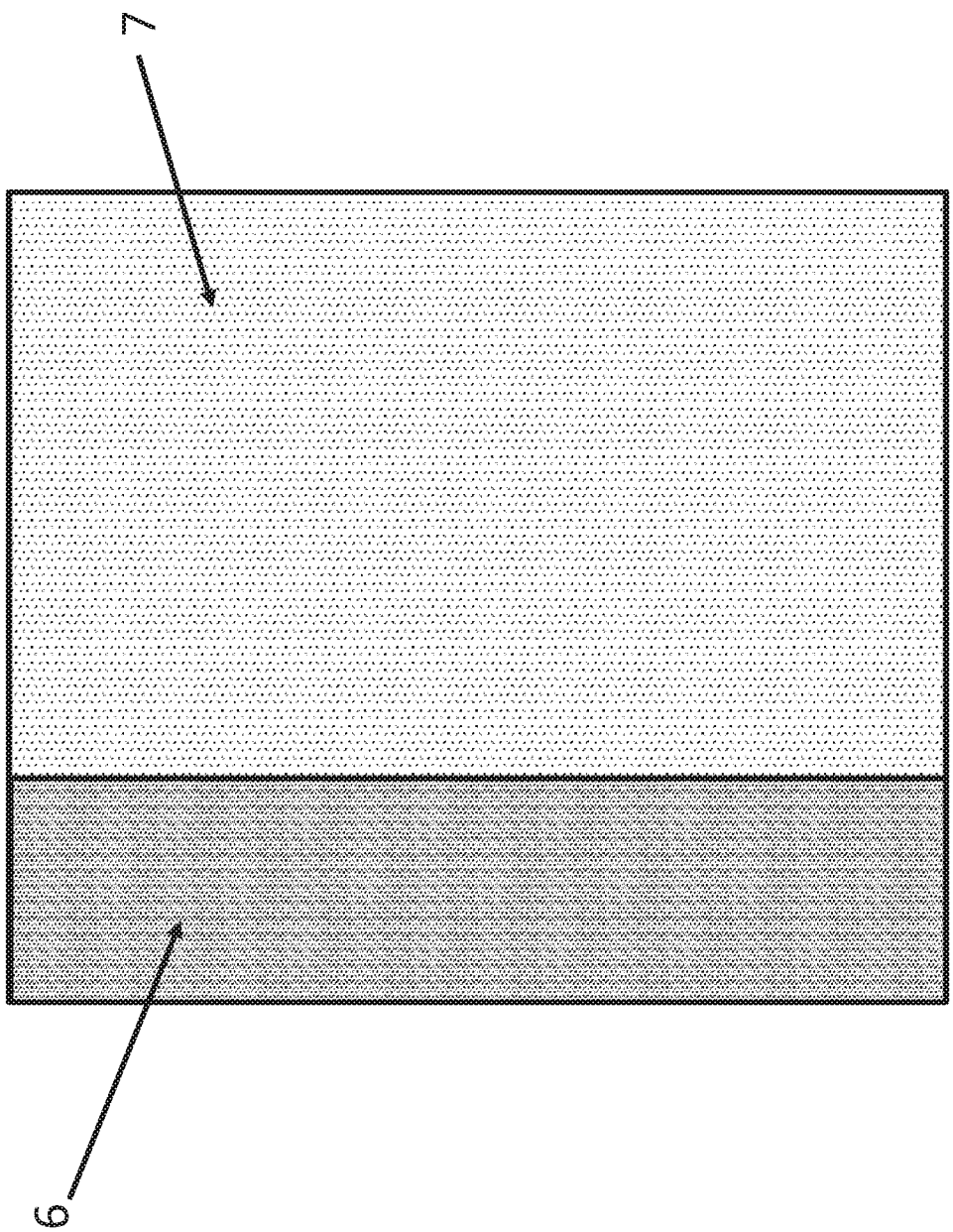
FIG. 4 depicts a flow straightener element consisting of a perforated plate and a mesh screen situated over the left hand portion of the perforated plate.

FIG. 4 shows a face-on view of one embodiment of a flow straightener of the invention, one having a perforated plate 7 and a mesh screen 6. The flow straightener is designed to promote more uniform air flow to the catalytic monolith. Without a flow straightener, air flow emerging from the baffle of the burner is biased toward the near side of the monolith, while the far side receives little air flow. The flow straightener provides for more even air flow and air pressure reaching the monolith, improving performance, efficiency, and life span of the catalytic monolith.

The particular specifications for the perforated plate (e.g., the diameter of the holes) and screen (e.g., the kind and other parameters) can be adjusted to straighten the air flow for any specific application. In some embodiments, the perforated plate 7 is about 0.05 inches thick, substantially the same length and width as the adapter, and is sufficiently rigid to be supported solely by the upper lip around the perimeter of the upper portion of the adapter. The perforated plate 7 is provided with holes allowing air to flow through toward the monolith module(s). In some embodiments, the perforated plate has 3/32 inch diameter holes in a 3/16 inch staggered center pattern.

In some embodiments, the flow straightener has a stainless steel mesh screen 6, such as a 200 mesh screen with openings of about 0.002 inch, which screen covers a portion of one side of the perforated plate. For example, the mesh screen 6 may cover about six inches of the left side of the perforated plate 7. The mesh screen 6 imposes a restriction on the air flow flux through the perforated plate 7 on the side of the perforated plate 7 closest to the air flow's emergence from the baffle of the burner, thereby providing more uniform air flow to the entirety of the catalytic monolith.

In other embodiments, the flow straightener's perforated plate 7 has holes in a graduated pattern from smallest on the side nearest the baffle to largest on the side furthest from the baffle. Such a perforated plate functions as a flow straightener without the need for a mesh screen 6 to restrict the flow on the baffle side. Instead, the smaller holes on the baffle side together with progressively larger holes on the distal side promote the desired uniformity of air flow. As those of skill in the art will appreciate, the flow straightener perforated plate may be constructed with a variety of hole patterns, both in the size of the holes and their placement, in order to accomplish more uniform straightened air flow in a particular burner.

FIG. 5 shows the air flow path in a Mark V $CO—H_2$ burner. This burner was designed for a fixed bed catalyst such as Hopcalite® type catalysts. After passing over the heater (not shown), the contaminated air travels upward within a narrow duct along the right hand side and over a baffle from the right hand side to the left before making a sharp turn downward to the catalyst chamber 18. The direction of air flow upstream from the catalyst chamber on the left hand side is predominately downward with a high velocity. The velocity of the air flow nearer the right hand side is much lower and less directed downward. Such a velocity profile is not suitable for a channeled monolith because air cannot travel from left to right within the monolith. The flow at the left side would be much higher than on the right side and such conditions would result in an overall diminished performance. Also, the top right hand side within the channels would tend to wear because it is the point where the air must suddenly alter paths from a slanted or angled downward direction to a straight downward direction. The tab supports 17 for the catalyst drawer are shown and allow the drawer to slide in and out.

FIG. 6 shows an embodiment of the adapter inserted into the Mark V $CO—H_2$ burner with a catalytic monolith module 11 installed. The perforated plate 7 and screen 6 are supported about one inch above the monolith module 11. The tab supports 17 that support the adapter (via the tabs 8) in the burner also prevent flow bypassing along the sides of the adapter. The air flow is straightened above the monolith module 11 and travels uniformly through the monolith catalyst therein.

In some embodiments of the invention, the adapter 1 and perforated plate 7 as well as the frame 14 of the catalyst module 11 are constructed from stainless steel, Inconel®, Incoloy®, or the like. In other embodiments these components can be constructed from other metals or alloys that are resistant to degradation in the chemical and thermal environment present in the burner. The frame 14 of the module 11 protects the fragile catalytic monoliths from damage. The monolith module 11 fits into the adapter 1, which is then inserted directly into the burner, resting on the supporting tabs 17 of the burner. A catalyst tray or drawer designed to hold the disadvantageous granular catalyst is not needed.

The adapter can easily accommodate both metal foil catalytic monoliths and extruded ceramic catalytic monoliths. Extruded ceramic catalytic monoliths are suitable for submarine application because they tend to be resistant to acid gases that may form from the undesired oxidation of compounds such as halogenated VOC. Typical extruded ceramic catalytic monoliths have channel densities (sometimes referred to as cell densities) ranging from 100 to 600 channels (or cells) per square inch. Depending on the application, extruded ceramic catalytic monoliths for the invention will have at least 50, preferably 100, more preferably 400 or more channels per square inch. In one preferred embodiment for submarine $CO—H_2$ burners, the monoliths have a cell density of at least 400 channels per square inch. The geometric surface area and void fraction of a 400 channels per square inch monolith are approximately 64 $cm^2/cm^3$ and 0.64, respectively.

In other embodiments, metal foil catalytic monoliths are also suitable for submarine applications. One advantage provided by such monoliths is that they can easily be constructed to most desirable dimensions. For example, a monolith module having a single metal foil catalytic monolith within can be made having dimensions of 32 inches long by 22½ inches wide by 4⅜ inches deep, which would therefore fit in an adapter designed for the Mark V $CO—H_2$ burner. By contrast, extruded ceramic catalytic monoliths having channel densities in the range of 400 channels per square inch are usually limited in size to 6 inch by 6 inch blocks, so that multiple monoliths and fractions thereof are needed to complete a monolith module.

Typically, a metal foil catalytic monolith is designed to provide an "effective" channel density greater than 50, preferably greater than 100, more preferably greater than 150 channels per square inch. The channel density for metal foil catalytic monoliths is referred to as "effective" because unlike the extrusion process for extruded ceramic monoliths, a metal foil catalytic monolith may be constructed by spiral winding of metal foil, or alternatively by folding metal foil, typically corrugated metal foil, to create the channels. In one preferred catalytic monolith for submarine CO—$H_2$ burners, the metal foil catalytic monolith has an effective channel density of at least 150 channels per square inch. The geometric surface area and void fraction of a monolith with an effective channel density of 185 channels per square inch made from corrugated foils in a herringbone pattern that are then folded to make layers is approximately 20 $cm^2/cm^3$ and 0.84, respectively.

The adapter containing a catalytic monolith module is oriented to accommodate the direction of air flow of the burner in which it will be used. For the Mark V CO—$H_2$ burner, for example, the air flow is downward (as shown in FIGS. 5 and 6). Alternatively, in the Mark IV CO—$H_2$ burner the air flow is horizontal, and the adapter of the invention would simply be suitably oriented.

The following Example serves to illustrate the present invention and are not intended to limit its scope in any way.

EXAMPLES

Example 1—an Adapter for a Monolith Catalyst Module for Use in a Mark V CO—$H_2$ Burner An adapter of the invention was constructed from ⅛ inch carbon steel sheet metal, with outside dimensions of 32¼ inches long by 22¹¹⁄₁₆ inches wide by 4¹⁵⁄₁₆ inches deep. In order to simplify construction, the sheet metal was cut to the necessary dimensions and folded to make 90 degree angles to provide 1 inch lips on the top and bottom. The pieces were then welded along mitered corners to produce the complete rectangular structure. The device was equipped with an air flow straightener having an Incoloy® 625 perforated plate with ³⁄₃₂ inch diameter holes in a ³⁄₁₆ inch staggered centers pattern, with an open area of about 50%. The perforated plate was 0.05 inches thick, substantially the same length and width as the adapter (32¼ inches long by 22¹¹⁄₁₆ inches) and was sufficiently rigid to be supported solely by a 1 inch lip along the perimeter of the top of the adapter. The flow straightener was constructed with a 200 mesh stainless steel screen with openings of about 0.002 inch, which screen covered 6 inches of the left hand side of the perforated plate. The tabs were also made from ⅛ inch thick carbon steel sheet metal and were welded to extend outward from the sides of the adapter by ¼ inch. The tabs were 1⅜ inches from the bottom of the adapter to ensure proper placement in the catalytic chamber.

A catalytic monolith module was constructed with a stainless steel frame which measured 32 inches long by 22¼ inches wide by 4 inches deep. Individual extruded ceramic monolith blocks were constructed from cordierite, and were 6 inches square by 3½ inches deep, with a channel density of 400 channels per square inch. The catalytically active noble metal platinum was dispersed on a zirconia high surface area oxide support, which was then washcoated onto the extruded ceramic monoliths. The washcoated monolith blocks, now catalytically active extruded ceramic catalytic monoliths, were then arranged in the monolith module. High temperature ceramic insulation (Fiberfrax®) was used to seal between the monolith blocks to prevent air flow bypassing the monoliths. A heavy gauge stainless steel wire retainer screen with ⁷⁄₁₆ inch square openings was used to secure and constrain the monolith blocks within the monolith module at both the upstream and downstream surfaces of the monoliths in the catalytic monolith module.

Figure 7:
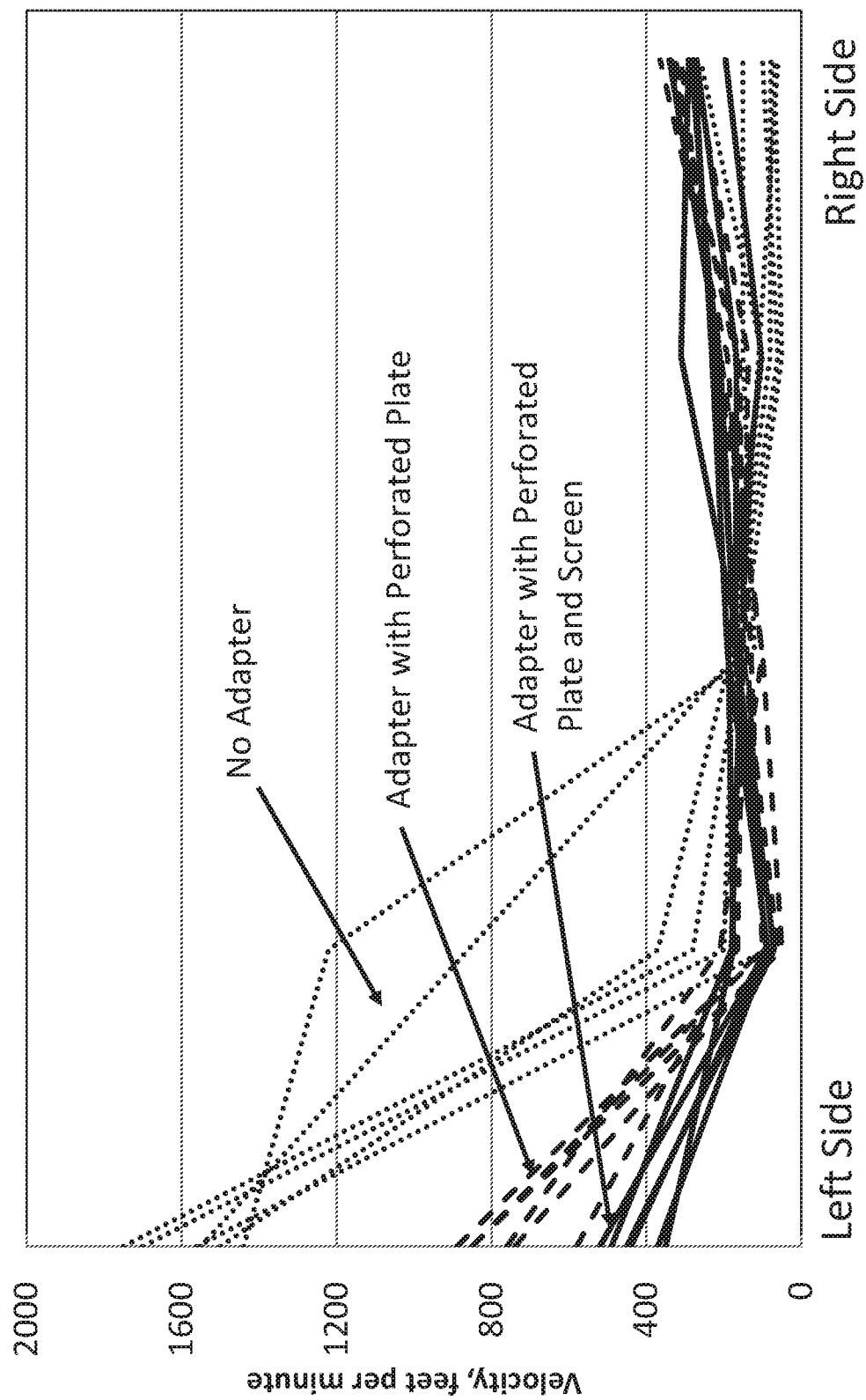
FIG. 7 provides velocity flow profiles in the catalyst chamber of a burner without an adapter, with an adapter and a uniform perforated plate flow straightener, and with a uniform perforated plate and screen on the left hand side.

FIG. 7 shows a comparison of the velocity profiles in the catalyst chamber when the adapter is not in place, with an adapter in place having a flow straightener in the form of a uniform perforated plate 7, and with an adapter in place having a flow straightener in the form of a uniform perforated plate 7 and a screen 6 on the left hand side. Severe non-uniform flow distribution is indicated by the high flow velocity on the left hand side when the adapter is not in place. The adapter using only the perforated plate 7 lowers the non-uniformity on the left side. The adapter with both the perforated plate 7 and screen 6 shows the lowest velocity on the left hand side. The average velocities for these three scenarios are 490, 305, and 240 feet per minute, respectively.

Figure 8:
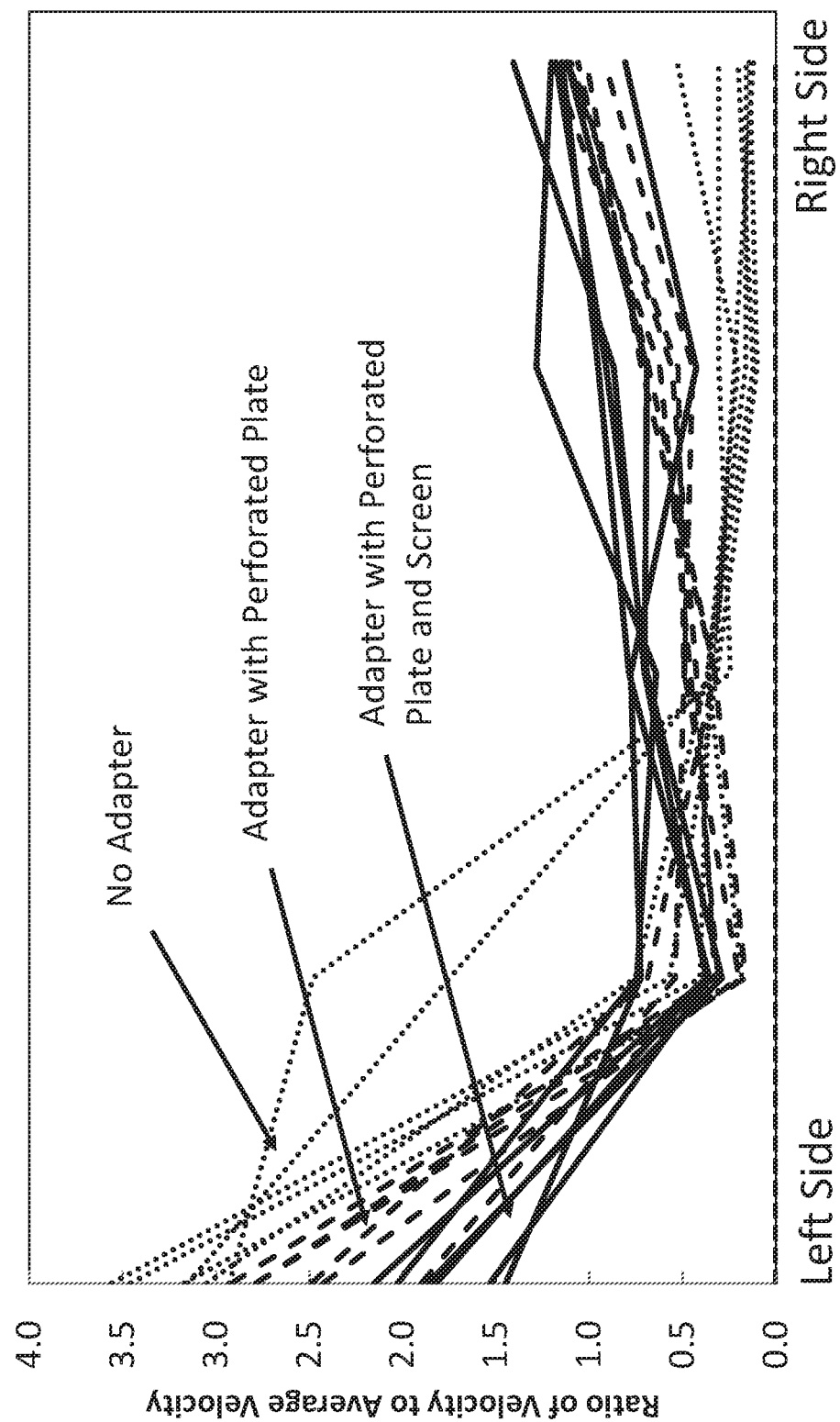
FIG. 8 provides a comparison of the local flow velocity to the average flow velocity for the three scenarios depicted in FIG. 7.

FIG. 8 shows a comparison of the local flow velocity to the average flow velocity for the three scenarios discussed above. The values were calculated by dividing the velocity measured at each point by the average velocity of all points. The case without the adapter shows severe velocity variation with the velocity on the left side being approximately 3.0 to 3.5 times higher than the average velocity and lower than average velocities on the right hand side. When the adapter and perforated plate are used, the velocity at the left hand side is between 2.0 to 3.0 times higher than the average velocity. The velocity toward the right hand is predominately lower than the average velocity. Adding the screen to the perforated plate produces the most uniform velocity profile. On the left hand side, the velocity ranges from about 1.5 to 2.0 times higher than the average and the ratio towards the right side is nearly 1.0. The perforated plate straightens the incoming air flow, helps reduce wear on the right hand side of the monolith channels, and is less prone to wear than the ceramic monolith substrate material because it is made from metal. Monolith ceramic, as well as the washcoat adhered to either ceramic or a metallic monolith, are relatively soft compared to the perforated plate. In this Example using a perforated plate with uniform size holes, flattening the velocity profile sufficiently to enable efficient use of the catalytic monoliths was assisted by the addition of a mesh screen. The combination of the perforated plate and mesh screen produced a flow straightening element that is sufficient to allow the catalytic monoliths to be used efficiently.

The adapter of Example 1 is well suited to accommodating catalytic monolith modules, whether metal or ceramic, for use in a variety of catalytic converters, such as a Mark V CO—$H_2$ burner. For other burners with different dimensions, such as the Mark IV CO—$H_2$ burner, suitable modifications to the dimensions of the adapter and catalytic monolith modules used therein may be made.

The present invention is not to be limited in scope by the specific embodiments described above, which are intended as illustrations of aspects of the invention. Although the invention has been described in detail with particular reference to such embodiments, other embodiments can achieve the same results. Functionally equivalent methods and components are within the scope of the invention. Various modifications of the invention, in addition to those shown and described herein, will be readily apparent to those skilled in the art from the foregoing description. Such modifications are intended to fall within the scope of the appended claims. All cited documents are incorporated herein by reference.

What is claimed is:

1. An adapter for accommodating a catalytic monolith module in a catalytic converter designed for use with a fixed bed catalyst drawer, the catalytic converter having a catalytic chamber, the adapter comprising:
   a rigid frame having an open front face; and
   an air flow straightener comprising a perforated plate and a screen;
   wherein the open front face permits insertion of the catalytic monolith module.

2. The adapter of claim 1, further comprising tabs extending longitudinally along a right face and a left face for being supported by tab supports in the catalyst chamber.

3. The adapter of claim 1, further comprising a lip on a bottom face for retaining the catalytic monolith module.

4. The adapter of claim 1, wherein the dimensions of the adapter are about 32¼ inches long, 22¹¹⁄₁₆ inches wide, and 4¹⁵⁄₁₆ inches deep.

5. The adapter of claim 4, wherein the catalytic converter is a $CO-H_2$ burner.

6. The adapter of claim 5, wherein the $CO-H_2$ burner is a Mark V $CO-H_2$ burner.

7. The adapter of claim 1,
   wherein the catalytic monolith module comprises:
      at least one catalytic monolith,
         wherein the at least one catalytic monolith comprises a catalytic noble metal dispersed on an oxide support washcoated onto a monolith substrate.

8. The adapter of claim 7, wherein the catalytic monolith is selected from the group consisting of an extruded ceramic catalytic monolith and a metal foil catalytic monolith.

9. The adapter of claim 8, wherein the catalytic monolith is extruded ceramic catalytic monolith with a channel density of at least 400 channels per square inch.

10. The adapter of claim 9, wherein the monolith module comprises a plurality of extruded ceramic catalytic monoliths separated by interstitial filler.

11. The adapter of claim 9, wherein the catalytic monolith module further comprises at least one retainer screen for retaining the at least one catalytic monolith.

12. The adapter of claim 8, wherein the catalytic monolith is metal foil catalytic monolith with an effective channel density at least 150 channels per square inch.

13. The adapter of claim 7, wherein
   the noble metal is a member of the group consisting of platinum, palladium, ruthenium, rhodium, and gold; and
   the oxide is a member selected from the group consisting of alumina, silica, zirconia, titania, and ceria.

14. The adapter of claim 7, wherein the noble metal is platinum.

15. The adapter of claim 7, wherein the oxide is zirconia.

16. The adapter of claim 7, wherein a gap spans a distance from an inlet surface of the catalytic monolith to a bottom surface of the perforated plate.

17. A method of adapting a catalytic converter designed for use with a fixed bed catalyst drawer for use with a monolithic catalyst, comprising the steps of:
   substituting an adapter of claim 1 for the fixed bed catalyst drawer;
   inserting at least one catalytic monolith module in the adapter; and
   inserting the adapter containing the at least one catalytic monolith module in the catalyst chamber of the $CO-H_2$ burner.

18. The method of claim 17, further comprising the steps of:
   removing the catalytic monolith module in the adapter when it is exhausted; and
   inserting a replacement catalytic monolith module in the adapter.

19. The method of claim 17, wherein the catalytic converter is a $CO-H_2$ burner.

* * * * *